No. 788,053. PATENTED APR. 25, 1905.
F. A. LAW.
STEERING GEAR FOR VEHICLES.
APPLICATION FILED APR. 3, 1902.

2 SHEETS—SHEET 1.

Witnesses:
H. W. Alden
M. L. Clark

Inventor
Fred A. Law,
by Hermann Stuntz
his attorney.

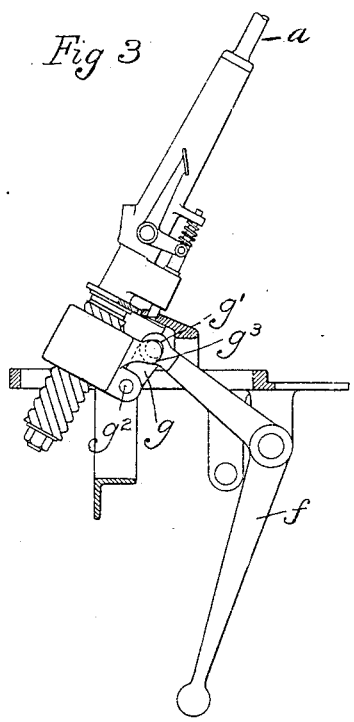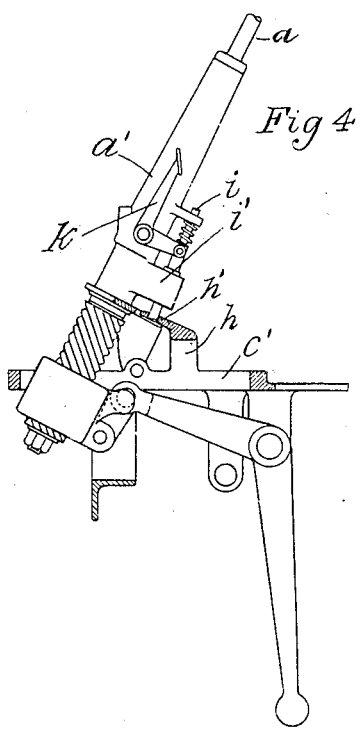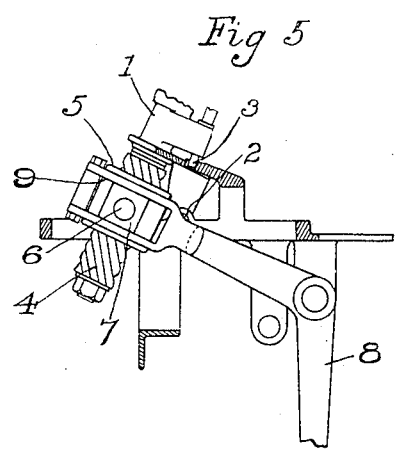

No. 788,053.
Patented April 25, 1905.

UNITED STATES PATENT OFFICE.

FRED A. LAW, OF HARTFORD, CONNECTICUT, ASSIGNOR TO ELECTRIC VEHICLE COMPANY, OF JERSEY CITY, NEW JERSEY, AND NEW YORK, N. Y., A CORPORATION OF NEW JERSEY.

STEERING-GEAR FOR VEHICLES.

SPECIFICATION forming part of Letters Patent No. 788,053, dated April 25, 1905.

Application filed April 3, 1902. Serial No. 101,290.

*To all whom it may concern:*

Be it known that I, FRED A. LAW, a citizen of the United States, and a resident of Hartford, in the county of Hartford and State of Connecticut, (whose post-office address is Hartford, Connecticut,) have invented certain new and useful Improvements in Steering-Gear for Vehicles, of which the following is a specification, reference being had to the accompanying drawings, forming a part thereof.

This invention relates to steering mechanism for self-propelled vehicles, in which a hand-wheel or its equivalent for guiding the vehicle is placed directly within the reach of the operator and substantially in front of him, and is more particularly concerned with the supports for the steering-pillar to which the hand-wheel or its equivalent is applied and with the mechanism between the hand-wheel or its equivalent and the system of levers or other devices by which movement is imparted to the steering-wheels of the vehicle.

The improved steering-gear belongs to that class in which provision is made for the proper support of the steering wheel or lever in working position close to the operator and for permitting it to be swung out of the way, so that it shall not interfere with the free movement of the operator or passengers into or from the vehicle, although some features of improvements may be applicable to a construction embodying a fixed steering-pillar.

One object of the invention is the provision of strong, reliable, and easily-operated connections between the steering wheel or lever and the system of levers, links, or other devices through which the desired movement is imparted to the steering-wheels.

Another object is to provide secure supporting means for the steering-wheel and its pillar.

Still another object is to prevent the transmission of shocks from the steering-wheels to the operator by reason of obstructions which have a tendency to deflect the wheels while permitting the proper deflection of the wheels at the will of the operator to be very easily accomplished.

Figure 1:
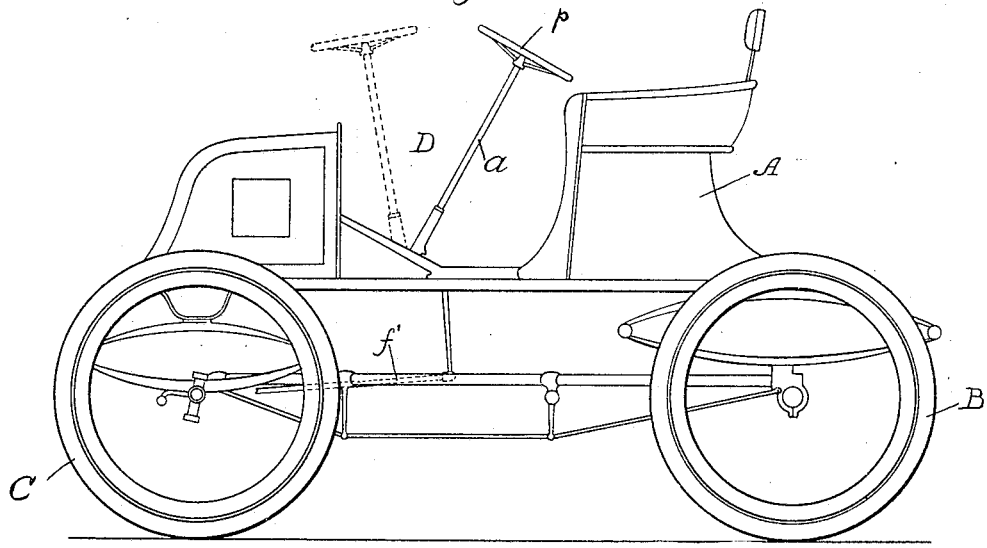
Figure 2:
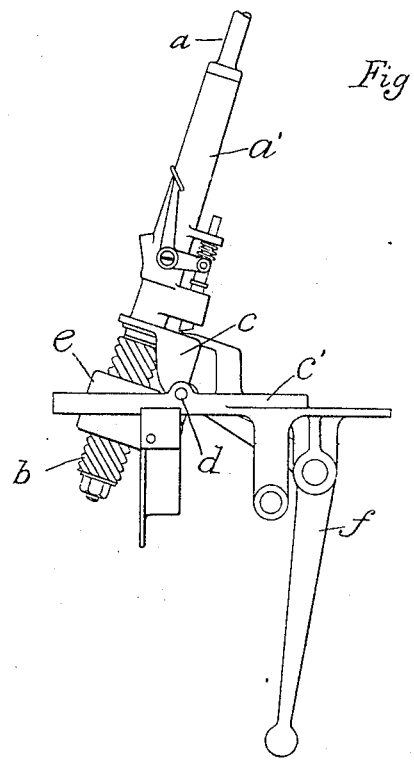

In the accompanying drawings, in which for purposes of explanation several embodiments of the invention are illustrated, Figure 1 is a view in side elevation of a self-propelled vehicle to which the improved steering-gear is applied, the normal position of the steering-wheel and its support being shown in full lines while the forward position of the same is represented by dotted lines. Fig. 2 is a detail view in side elevation, on an enlarged scale, showing the steering post or pillar and its appurtenant parts in normal position. Fig. 3 is a view similar to Fig. 2, but with the steering connections in a different position and with some parts broken out to show details of construction. Fig. 4 is a view similar to Fig. 3, but with the traverse-nut at the opposite limit of its movement. Fig. 5 is likewise a similar view, but illustrating a slightly different embodiment of the invention.

In Fig. 1 of the drawings the body A of the vehicle is represented as spring-supported upon the axles which carry the rear driving-wheels B and the steering-wheels C. The steering-pillar D is also shown in said figure as comprising a controlling or steering hand-wheel $p$, mounted upon a shaft or post $a$, which is provided with a bearing element, or is journaled in a bearing $a'$ of sufficient length to give the required stability to the mechanism and secured in any suitable manner at its lower end to a bifurcated bracket $c$. This steering-pillar is hinged or arranged to swing in a vertical longitudinal plane with reference to a framework $c'$, which may be applied directly to the frame or body of the vehicle, and is arranged to give the greatest possible amount of strength and stability, comprising a base-plate secured to the vehicle and a base or foot suitably formed for the support of the working parts, the bracket $c$ being secured thereto by pivot-pins $d$. The post or shaft $a$ is extended downward through the sleeve or bearing $a'$ and has applied to its lower end a quick-pitch screw $b$, which is engaged by a traverse-block or threaded element $e$, such threaded element and bearing element being relatively movable axially, the one with respect to the other, by rotation of the shaft *a* in either direction, the one of said elements, as the bearing element, being held against the axial thrust of the shaft, while the other is connected through a transmitting member to the steering-wheels of the vehicle. In the arrangement shown in the drawings the traverse nut or block *e* is held against rotation through its connection with the steering arm or rocker *f*, which is shown as a two-armed or angle lever pivoted to the frame *c'*, preferably by a transverse oscillating shaft mounted in suitable bearings in the frame and bearing at its lower end a knuckle, to which is connected the main steering-rod *f'*. Any suitable system of links and levers may be provided between the steering-rod *f'* and the steering-wheels to effect the desired deflection of the latter.

In the construction shown in detail in Figs. 2, 3, and 4 the approximate end of the steering arm or lever *f* is connected to the traverse nut or block *e* through a link *g*, pivoted as at *g'* and $g^2$, respectively. The traverse-nut is also forked, as at $g^3$, to embrace the link and the end of the arm *f*, so that rotary movement of such traverse nut or block with relation to the threaded portion of the shaft may be prevented. The connection of the nut with the arm through the link would prevent the rotation of the nut; but without the provision of the fork there might be excessive lost motion, as well as too much binding upon the pivots of the links.

An extension *h* of the frame *c'* is provided with a perforated lip *h'* for engagement with a latch or plunger *i*, carried in suitable bearings *i'*, upon the supporting-sleeve *a'* for the purpose of locking the steering-post in its operating position. A foot-press *k* or angle-lever adapted to be operated by the foot of the operator is mounted upon the sleeve *a'* and is operatively connected with the plunger. By reason of the mounting of the foot-press upon the steering-pillar not only does the pressure of the foot thereon release the latch, so that the steering-pilar may be thrown forward out of its normal position, but it also has the effect of throwing the pillar forward, thereby relieving the operator's hand and quickly clearing the space in front of the seat, so as to permit the unhindered exit of the operator.

It is to be noted that when the traverse-nut *e* is in its normal or middle position, as represented in Fig. 2, the axis of the pivots *d* of the frame *c* and the axis of the pivot connection between the link *g* and the arm or lever *f* are coincident, so that when the parts are in this position the steering-pillar can be swung forward or backward, as may be necessary, without straining or cramping any of the connected parts. It will therefore be unnecessary to turn the hand-wheel and the screw *b* in order to permit the movement of the steering-pillar out of its normal position. Furthermore, even if the traverse-nut *e* is not in its middle position nevertheless the steering-post may be moved freely without straining or cramping the parts, since the link *g* will accommodate the movement of the traverse nut or block with respect to the pivot *d* regardless of the position of the traverse-nut upon the screw. The axis upon which the steering-pillar swings is therefore so arranged and positioned with relation to the connections between the steering-arm *f* and the traverse-nut and such connections themselves are also so arranged that no movement is transmitted to the steering-arm by reason of any swinging movement of the steering-pillar upon its axis however the steering-nut may be placed upon the screw.

In the embodiment of the invention shown in Fig. 5 the steering-shaft is supported in a sleeve 1, similar to the sleeve *a'* of Figs. 2, 3, and 4, and is provided at its lower end, as before, with a quick-pitch screw, which is engaged by a traverse-nut 5. The support is pivoted upon the frame, as at 2, and is provided with a latch 3, substantially as previously described. The traverse-nut 5 in this form of device is provided on opposite sides with trunnions 6, upon which are provided slide-blocks 7. The steering arm or lever 8, in other respects similar to the arm or lever *f* of Figs. 2, 3, and 4, is forked at its forward end both to straddle the screw 4 and to form guideways 9 for the slide-blocks 7. This arrangement of the pivoted slide-blocks and guideways in the forked end of the steering-lever accomplishes the same result as link and forked connections between the traverse-nut and the steering-lever of Figs. 2, 3, and 4, holding the traverse-nut from rotation with relation to the screw 4 and permitting the free swinging movement of the steering-pillar without affecting the steering-lever, no turning movement of the steering-wheel being necessary to permit the swinging movement of the pillar.

In both forms herein illustrated and described the steering-pillar, or at least the rotating threaded lower portion thereof, has its axis lying in the plane in which the connections to the oscillating steering-arm *f* or 8 also lie, so that all the strains which tend to oscillate such steering arm or lever, and so deflect the steering-wheels, are in the same plane. This reduces the liability to cramping of the parts and insures perfect operation, lessening the wear and eliminating all unnecessary strains. The disposition of the bearings of the oscillating steering-arm symmetrically on either side of said plane is also advantageous in this respect, although not essential, particularly if the supporting-bearings of the arm are on opposite sides of the plane, as would be the case if the oscillating shaft were lengthened on one side of said plane to permit of the connection of a depending arm therewith at one side of the vehicle.

In addition to the variations in embodiment of the invention illustrated and described herein it will be understood that various other changes still embodying the invention are possible and that, as indicated hereinbefore, some features of the invention are capable of use with advantage independently of other features.

What I claim, and desire to secure by Letters Patent, is—

1. In combination in a steering mechanism, a hinged steering-pillar, a steering-shaft, movable with said hinged pillar and provided with a screw-thread, a traverse-nut, adapted to assume different positions axially of the steering-shaft, a steering-lever and connections intermediate of the traverse-nut and steering-lever, whereby a free swinging movement of the steering-pillar is permitted, irrespective of the position of the steering-lever.

2. In combination in a steering mechanism, a hinged pillar, a steering-shaft, movable with said pillar and having a movement relatively thereto a traverse-nut adapted for movement along the steering-shaft and controlled by the relative movement of the steering pillar and shaft, a steering-arm and connections intermediate of the arm and traverse-nut, whereby the position of the former is unaffected by the swinging movement of the steering-pillar.

3. In combination in a steering mechanism, a hinged steering-pillar, a traverse-nut and steering-shaft adapted to move with said pillar in its swinging movement and adapted for movements relatively thereto, a steering-arm provided with guideways and slide-blocks, the latter pivotally connected to the traverse-nut, whereby a movement of the traverse-nut is permitted relatively to the steering-arm.

4. In combination in a steering mechanism, a pillar comprising a rotating shaft and a support therefor, a threaded lower end portion on said rotating shaft, a traverse-nut surrounding said threaded portion of said shaft, a pivoted steering-arm having one arm engaging with said nut, and said connections between said arm and nut including guideways, preventing the rotation of said nut.

5. In a steering-gear for vehicles, a steering-pillar, a threaded portion on the lower end thereof adapted to be rotated by the occupant of the vehicle, a traverse-nut engaging with said threaded portion, a pivoted two-arm lever having one of its arms coöperating with connections to the steering-wheels of the vehicle, the other arm thereof engaging the traverse-nut, guideways coacting with said nut to prevent its rotation and permitting only its longitudinal movement when the steering-pillar is rotated.

6. In automobile steering-gear, a base for attachment to the floor or frame of the vehicle, a support or thrust-bearing on said base for a rotating steering-pillar, a rotating steering-pillar and a screw portion thereon below the support on said base, a second bearing in said base for the support of a transverse oscillating shaft, a depending oscillating arm on said shaft, connections between said threaded lower portion of the steering-shaft and the transverse shaft for oscillating the latter as and for the purpose described.

7. In automobile steering-gear, a rotating shaft, a wheel or lever in proximity to the occupant's seat to rotate said shaft, a base-support including a base-plate attached to the vehicle, a non-rotatable journal or supporting-pillar projecting upwardly from said base-plate, said rotating shaft journaled in said supporting-pillar and extending downwardly through the same, means on said rotating shaft and pillar to prevent relative longitudinal movement, a quick-pitch threaded portion on the lower end of said rotatable shaft, a traverse-nut mounted on said quick-pitch portion, means engaging said traverse-nut to prevent its rotation, connections from the steering-wheels and a two-armed pivoted lever, one arm of which is attached to said connections while the other arm is connected with and adapted to be moved by the traverse-nut.

8. In automobile steering mechanism, a rotating shaft, a journal or supporting-sleeve mounted on the body floor or frame of a vehicle, means coacting with said sleeve and said shaft whereby longitudinal relative movement is prevented, a quick-pitch screw on the lower end of said rotating shaft, a traverse-nut on said quick-pitch screw, and a two-armed or angle lever pivoted to the framework or body-floor of said vehicle and thereby rigidly supported in fixed relation to the shaft-support, one arm thereof flexibly connected with and adapted to be moved by said traverse-nut and the other arm connected to parts extending to the steering-wheels.

9. In automobile steering mechanism, a rotating shaft, a journal or supporting-sleeve mounted on the body floor or frame of a vehicle, means coacting with said sleeve and said shaft whereby longitudinal relative movement is prevented, a quick-pitch screw on the lower end of said rotating shaft, a traverse-nut on said quick-pitch screw, and a two-armed or angle lever pivoted to the framework or body-floor of said vehicle and thereby rigidly supported in fixed relation to the shaft-support, one arm thereof flexibly connected with and adapted to be moved by said traverse-nut and the other arm connected by links or bars to the steering-wheels, and means on said pivoted lever and traverse-nut coöperating whereby rotation of the nut is prevented.

10. In steering-gear for automobiles, a rotating shaft, a base-supporting pillar, a journal therein to support said shaft, a quick-pitch screw on the lower end of said shaft, a traverse-nut on said quick-pitch screw, a two-armed lever journaled on the lower side of said base, one arm of said lever including a yoked end embracing said traverse-nut, and connections from the steering-wheels to the other arm thereof, as and for the purpose described.

11. In combination in a base or foot for a steering-gear on a vehicle-body, a base-plate, a journal or supporting-pillar, a journal for a two-armed lever, a two-armed lever, a quick-pitch screw below said pillar-journal, a traverse-nut thereon and means for preventing rotation of said traverse-nut.

12. In a steering-gear for automobiles, a rotating shaft, a base or foot therefor supported on the body floor or frame and carrying a journal, a steering-shaft supported in said journal, another journal or bearing in said base and means supported therein carrying a substantially vertical arm connected with the links to operate the steering-wheels, a threaded portion on the lower part of said shaft, a threaded traverse member coacting with the threaded portion of the shaft and adapted to move axially of the shaft, means to prevent rotation of said threaded traverse member and connections between the vertical arm or its supporting means and the traverse member whereby movement of the latter longitudinally of the steering-shaft will oscillate the arm and thereby deflect the steering-wheels.

13. In combination in a base or foot for a steering-gear on a vehicle frame or body, a base-plate, a journal or supporting-pillar, pivotal connections between said journal or support and the base-plate, a journal for a two-armed lever, a two-armed lever, a quick-pitch screw below said pillar-journal, a traverse-nut thereon, and means for preventing rotation of said traverse-nut.

14. In steering-gear for automobiles, a rotating shaft, a pivoted journal or supporting-pillar, a quick-pitch screw on said shaft below said support, a traverse-nut coöperating therewith to be moved longitudinally by the rotation of said shaft, a latch mounted upon said pivoted pillar-support or journal.

15. In a steering mechanism for automobiles, a rotating shaft, with a free upper portion, the lower portion mounted within a journal or sleeve, a quick-pitch-screw portion on said lower portion, a traverse-nut, means to prevent the rotation of said traverse-nut and connections with said steering-wheels flexibly coacting with said traverse-nut and independent of said means.

16. In a steering mechanism for automobiles, a rotating shaft with a free upper portion, the lower portion mounted within a journal or pillar, a threaded part on said lower portion, a traverse member, means to prevent the rotation of said traverse member and connections with said steering-wheels coacting with said traverse member, an operating-wheel on the upper free end of said steering-pillar, hinged connection whereby the operating-wheel may be moved to and fro, means to lock said operating-wheel in a predetermined position.

17. In a steering mechanism for an automobile, a rotating shaft having a free upper portion, an operating-wheel thereon normally in proximity to the operator's seat, the lower portion mounted within a pillar, a threaded part on said lower portion, an engaging threaded block or member adapted to move longitudinally thereof, means to prevent rotation of said block or member, and connections to the steering-wheels flexibly engaging with said threaded block or member and hinged connections whereby the operating-wheel may be thrown out of its normal position away from the operator's seat.

18. In a steering-gear for motor-vehicles, an upright rotating steering-pillar, a support therefor, means for moving the steering-shaft away from and to the occupant of the vehicle, a foot-press mounted on and moving with the members moving to and away from the occupant, a latch to hold the steering-pillar in a predetermined position, said foot-press coöperating to release the latch and also to move the pillar or steering-shaft away from the occupant, as and for the purpose described.

19. In steering-gear for motor-vehicles, a hinged steering-pillar, and a latch mounted upon said pillar including a foot-press.

20. In a steering-gear for motor-vehicles, a steering-shaft, a hinged pillar or support at the base thereof, a steering-wheel at the free upper end thereof, the vehicle-support for said steering-gear, latch parts mounted on the vehicle proper and the hinged pillar, and means for operating the latch on the pillar and movable therewith.

21. In a steering-gear for motor-vehicles, a steering-shaft and means for rotating the same, a pillar or supporting-bearing for the base thereof, a screw on the lower part of the shaft, a traverse-block on said threaded portion, means for preventing rotation of said block, a pivoted steering connection-lever, and connections between said block and said lever including a pin and engaging slot.

22. In a steering-gear for motor-vehicles, a steering-shaft, and means for rotating the same, a pillar or support-bearing for the base thereof, a screw on the lower part of the shaft, a traverse-block on said threaded portion, a pivoted steering connection-lever, connections between said arm and said block including a trunnion with a block and a slotted guide.

23. In a steering-gear for motor-vehicles, a rotating member adapted to be moved by the operator, an engaging screw-threaded member moving axially of said first member and connected with a pivoted lever, the connections including a forked arm, guides in said forked arm, a trunnion-block and a trunnion having bearings in said block and means for preventing rotation of the second threaded member.

24. In steering mechanism for motor-vehicles, the combination of a bracket adapted to be secured to the running-gear, and having an upwardly-extended inclined bearing-sleeve, a steering-shaft mounted in and projecting through said sleeve, and having, at its lower end, a quick-pitch screw, and having, at its upper end, means for turning said shaft, with a nut upon the threaded end of said shaft, a rocker engaging with and adapted to be operated by said nut, means preventing the rotation of the nut, and mechanism connecting the rocker with the steering-wheels of the vehicle, substantially as specified.

25. In steering mechanism for motor-vehicles, the combination of a sleeve, a steering-shaft mounted in and projecting through said sleeve, and having, at its lower end, a quick-pitch screw, and having, at its upper end, means for turning said shaft, with a nut upon the threaded end of said shaft, a rocker, forked connections between the rocker and the nut, and mechanism connecting the rocker with the steering-wheels of the vehicle, substantially as specified.

26. In steering mechanism for motor-vehicles, the combination of a bracket adapted to be secured to the running-gear, having an upwardly-extended inclined bearing-sleeve and depending supports for a rocker, a steering-shaft rotatably mounted in said sleeve and projecting beyond both ends thereof, and having a quick-pitch screw at its lower end and means for turning at its upper end, with a nut upon the threaded end of said shaft, a rocker mounted in said bracket, forked connections between the rocker and the nut, and mechanism connecting the rocker with the steering-wheels of the vehicle, substantially as specified.

27. In a steering mechanism for motor-vehicles, the combination of a shaft having a screw, a threaded element thereon, a bearing element on said shaft, said bearing and screw-threaded elements being relatively movable axially by rotation of the shaft, means to hold one of said elements against the axial thrust of the shaft, a member connected with the other element for transmitting the axial movement thereof to the steering-wheels of the vehicle, and provisions for permitting the shaft and its two elemen s to swing with respect to said member without varying the relative axial position of said elements.

28. In a steering mechanism for motor-vehicles, the combination of a shaft having a screw, a screw-threaded element thereon, a bearing element on said shaft, said bearing and screw-threaded elements being relatively movable axially by rotation of the shaft, means to hold one of said elements against the axial thrust of the shaft, a member connected with the other element for transmitting the axial movement thereof to the steering-wheels of the vehicle, provisions for permitting the shaft and its said two elements to swing with respect to said member without varying the relative axial position of said elements, and means for locking said shaft against swinging movement.

29. In combination with a steering mechanism, a rotating shaft, a threaded portion on said shaft, a traverse-nut surrounding said threaded portion, a second shaft carrying a member in operative engagement with said nut, means for preventing rotation of said nut, and a base for attachment to the vehicle having an elongated support for the first-named shaft and bearings for the second-named shaft, whereby the second shaft is supported in fixed relation to the first-named shaft-support.

30. In combination in a steering mechanism, a base-plate for attachment to the vehicle having a base or foot for the steering-gear, an elongated upright support for a shaft carried by the base or foot and comprising a journal for the shaft, a shaft, a quick-pitch screw alined with said journal, a traverse-nut, a member engaging said traverse-nut, and means for preventing rotation of said traverse-nut.

31. In combination in a steering mechanism for automobiles, a base-plate and support for a steering-shaft, a steering-shaft, a threaded portion on the lower end of said steering-shaft, a depending two-armed rocker having pivotal support in fixed relation with said plate, one arm of said rocker being bifurcated and embracing a nut, said nut mounted on the threaded portion of said shaft and having sliding trunnion-bearings in said bifurcated rocker-arm.

32. In combination in a steering mechanism, a rotating shaft and a support therefor, a threaded lower portion on said rotating shaft, a traverse-nut surrounding said threaded portion of said shaft, a pivoted steering-arm having an arm engaging with said nut, close-fitting, interengaging means between said arm and said nut coöperating to prevent rotation of said nut.

33. In a steering-gear for motor-vehicles, a steering-shaft and means for rotating same, a supporting-bearing for the base thereof, a screw on the lower portion of said shaft, a threaded sleeve on said threaded portion, means for preventing rotation of said sleeve, a pivoted steering connection-lever, and connections between said sleeve and said lever, including a trunnion and coöperating sliding member.

34. In combination in a steering mechanism, a steering-arm and connections intermediate of the arm and the steering-wheels, a rotary screw-threaded member, a threaded nut thereon and adapted for movement upon rotation of said threaded member, and connections intermediate of the nut and steering-arm whereby motion is transmitted to said steering-arm only upon movement of the nut incidental to the rotation of said screw-threaded member, an upwardly-extending steering-shaft, and a base-plate adapted for attachment to the vehicle body or floor, said screw-threaded member and steering-arm being supported in bearings carried by said base-plate.

35. In a steering mechanism for vehicles, a rotary steering-shaft mounted for swinging movement independent of its rotary steering movement, a device in operative engagement with said shaft and partaking of said swinging movement, and steering connections in operative relation with said device and comprising provisions for permitting said swinging movement.

36. In a steering mechanism for vehicles, a rotary steering-shaft mounted for swinging movement independent of its rotary steering movement, a device in operative engagement with said shaft and partaking of said swinging movement, steering connections in operative relation with said device and comprising provisions for permitting said swinging movement, and means for locking the shaft against said swinging movement.

This specification signed and witnessed this 20th day of June, A. D. 1901.

FRED A. LAW.

In presence of—
  WM. H. BARKER,
  F. C. HILL.